US012715357B2

(12) United States Patent
Mukai

(10) Patent No.: US 12,715,357 B2
(45) Date of Patent: Aug. 25, 2026

(54) VEHICLE CONTROL SYSTEM

(71) Applicant: TOYOTA JIDOSHA KABUSHIKI KAISHA, Toyota (JP)

(72) Inventor: Fumiya Mukai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 18/922,913

(22) Filed: Oct. 22, 2024

(65) Prior Publication Data

US 2025/0236237 A1 Jul. 24, 2025

(30) Foreign Application Priority Data

Jan. 19, 2024 (JP) ................................ 2024-006630

(51) Int. Cl.

| | |
|---|---|
| ***B60Q 1/50*** | (2006.01) |
| ***G06V 10/24*** | (2022.01) |
| ***G06V 10/60*** | (2022.01) |
| ***G06V 20/58*** | (2022.01) |
| ***G06V 40/10*** | (2022.01) |

(52) U.S. Cl.

CPC ............... *B60Q 1/50* (2013.01); *G06V 10/24* (2022.01); *G06V 10/60* (2022.01); *G06V 20/58* (2022.01); *G06V 40/10* (2022.01); *B60Q 2400/50* (2013.01)

(58) Field of Classification Search

CPC ...... B60Q 1/50; B60Q 2400/50; G06V 10/24; G06V 10/60; G06V 20/58; G06V 40/10; B60W 40/02; B60W 2554/40

See application file for complete search history.

(56) References Cited

U.S. PATENT DOCUMENTS

| | | | | |
|---|---|---|---|---|
| 6,285,778 | B1 * | 9/2001 | Nakajima | G06V 10/145 382/104 |
| 9,969,261 | B2 | 5/2018 | Kodama | |
| 10,045,173 | B1 | 8/2018 | Morimura et al. | |
| 10,106,157 | B2 | 10/2018 | Sawada et al. | |
| 10,150,407 | B2 | 12/2018 | Takahashi et al. | |
| 10,696,297 | B2 | 6/2020 | Nguyen Van et al. | |
| 11,001,255 | B2 | 5/2021 | Fukuman et al. | |
| 11,110,937 | B2 | 9/2021 | Kinoshita et al. | |

(Continued)

FOREIGN PATENT DOCUMENTS

JP 2021-127071 A 9/2021

*Primary Examiner* — Quan Zhen Wang
*Assistant Examiner* — Rajsheed O Black-Childress
(74) *Attorney, Agent, or Firm* — SoraIP, Inc.

(57) ABSTRACT

The vehicle control system includes a projection device that projects a predetermined figure on a road surface around the own vehicle, an object recognition device that recognizes a specific target located around the own vehicle based on a peripheral image obtained by photographing a peripheral area of the own vehicle, and outputs position information that is information about a relative position between the own vehicle and the specific target, and a processor that controls the projection device and the object recognition device. The processor executes a predetermined correction process for correcting the relative position acquired from the position information when the graphic image projected on the road surface by the projection device overlaps with a target recognition image that is a region recognized as the specific target in the peripheral image.

4 Claims, 4 Drawing Sheets

(56) References Cited

U.S. PATENT DOCUMENTS

| | | | | |
|---|---|---|---|---|
| 2007/0154068 | A1* | 7/2007 | Stein | G01B 11/14<br>348/148 |
| 2014/0368613 | A1* | 12/2014 | Krupka | G01S 7/497<br>348/46 |
| 2015/0243017 | A1* | 8/2015 | Fujimoto | G01S 11/12<br>348/142 |
| 2019/0001968 | A1 | 1/2019 | Yorifuji et al. | |
| 2019/0344828 | A1 | 11/2019 | Omori et al. | |
| 2019/0389488 | A1 | 12/2019 | Yamada et al. | |

* cited by examiner

FIG. 3

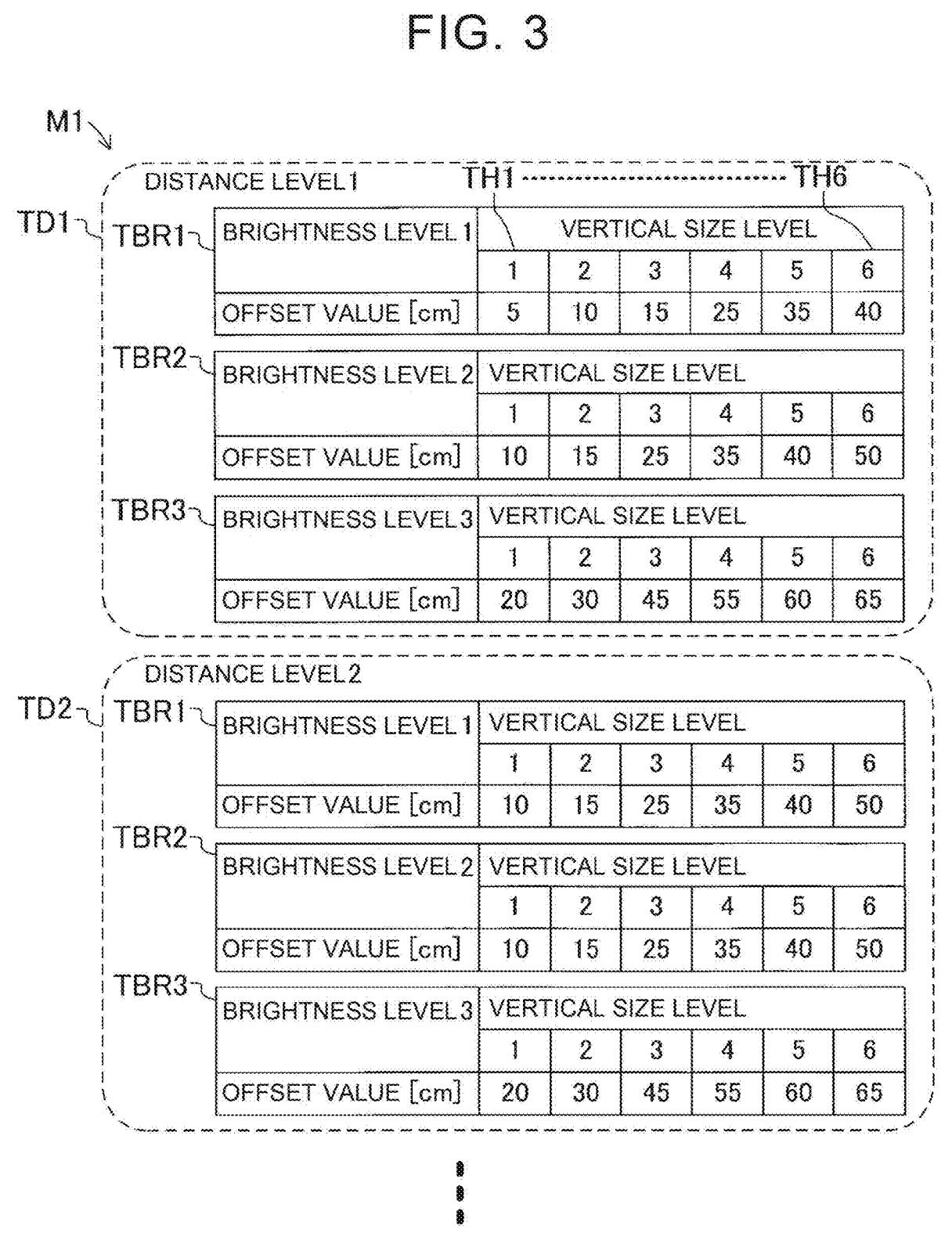

| BRIGHTNESS LEVEL 1 | VERTICAL SIZE LEVEL | | | | | |
|---|---|---|---|---|---|---|
| | 1 | 2 | 3 | 4 | 5 | 6 |
| OFFSET VALUE [cm] | 5 | 10 | 15 | 25 | 35 | 40 |

| BRIGHTNESS LEVEL 2 | VERTICAL SIZE LEVEL | | | | | |
|---|---|---|---|---|---|---|
| | 1 | 2 | 3 | 4 | 5 | 6 |
| OFFSET VALUE [cm] | 10 | 15 | 25 | 35 | 40 | 50 |

| BRIGHTNESS LEVEL 3 | VERTICAL SIZE LEVEL | | | | | |
|---|---|---|---|---|---|---|
| | 1 | 2 | 3 | 4 | 5 | 6 |
| OFFSET VALUE [cm] | 20 | 30 | 45 | 55 | 60 | 65 |

| BRIGHTNESS LEVEL 1 | VERTICAL SIZE LEVEL | | | | | |
|---|---|---|---|---|---|---|
| | 1 | 2 | 3 | 4 | 5 | 6 |
| OFFSET VALUE [cm] | 10 | 15 | 25 | 35 | 40 | 50 |

| BRIGHTNESS LEVEL 2 | VERTICAL SIZE LEVEL | | | | | |
|---|---|---|---|---|---|---|
| | 1 | 2 | 3 | 4 | 5 | 6 |
| OFFSET VALUE [cm] | 10 | 15 | 25 | 35 | 40 | 50 |

| BRIGHTNESS LEVEL 3 | VERTICAL SIZE LEVEL | | | | | |
|---|---|---|---|---|---|---|
| | 1 | 2 | 3 | 4 | 5 | 6 |
| OFFSET VALUE [cm] | 20 | 30 | 45 | 55 | 60 | 65 |

VEHICLE CONTROL SYSTEM

CROSS-REFERENCE TO RELATED APPLICATION

This application claims priority to Japanese Patent Application No. 2024-006630 filed on Jan. 19, 2024, incorporated herein by reference in its entirety.

BACKGROUND

1. Technical Field

The present disclosure relates to a vehicle control system including a projection device that projects a predetermined figure on a road surface around a target vehicle, and an object recognition device that detects a position of a specific object located around the target vehicle (a distance between the target vehicle and the specific object) based on an image obtained by imaging a peripheral region around the target vehicle.

2. Description of Related Art

A projection device that projects a predetermined figure on a road surface around a target vehicle has been proposed (see, for example, Japanese Unexamined Patent Application Publication No. 2021-127071 (JP 2021-127071 A)).

SUMMARY

There is known an object recognition device that recognizes a specific object (for example, a pedestrian) by analyzing a peripheral image obtained by imaging a peripheral region around a target vehicle (based on trained data), and acquires a position of the object (a distance between the target vehicle and the specific object). When the specific object enters the figure projected on the road surface or when the specific object is located near the figure, the beam (direct light or reflected light) of the projection device is radiated onto part of the specific object. Therefore, part of the image of the specific object may be blurred in the peripheral image. In this case, in the peripheral image, the accuracy of the region recognized as the specific object by the object recognition device is low, and the accuracy (correctness) of the position information acquired based on coordinates of the region is low.

An object of the present disclosure is to provide a vehicle control system including a projection device that projects a predetermined figure on a road surface around a target vehicle, and an object recognition device that detects, based on an image of a peripheral region around the target vehicle, a position of a specific object located in the region (a distance between the target vehicle and the specific object), and capable of suppressing a decrease in accuracy of detection of the position of the specific object.

In order to solve the above problem, a vehicle control system according to the present disclosure includes:

a projection device configured to project a predetermined figure on a road surface around a target vehicle;

an object recognition device configured to recognize a specific object located around the target vehicle based on a peripheral image obtained by imaging a peripheral region around the target vehicle, and output position information that is information on a relative position between the target vehicle and the specific object; and a processor configured to control the projection device and the object recognition device. The processor is configured to execute a predetermined correction process including correcting the relative position acquired from the position information when a figure image projected on the road surface by the projection device overlaps an object recognition image that is an image of a region recognized as the specific object in the peripheral image.

The vehicle control system according to the present disclosure includes the projection device configured to project the predetermined figure on the road surface around the target vehicle, and the object recognition device configured to acquire the position information indicating the relative position between the target vehicle and the specific object based on the peripheral image. When the object recognition image (the region recognized as the specific object in the peripheral image) overlaps the figure image, the accuracy of the position information may be low. In the vehicle control system according to the present disclosure, when both the images overlap each other, the relative position that is the position of the specific object relative to the target vehicle and is acquired from the position information is corrected by the predetermined correction process. Accordingly, a decrease in the accuracy of detection of the position of the specific object relative to the target vehicle is suppressed.

The vehicle control system according to an aspect of the present disclosure may include a position deviation map that defines a deviation amount between a first position and a second position acquired from the position information output from the object recognition device when a positional relationship between the target vehicle and the specific object is the same. The first position is a position of the specific object relative to the target vehicle and acquired from the position information output in a first state in which the figure image overlaps the object recognition image. The second position is a position of the specific object relative to the target vehicle and acquired from the position information output in a second state in which the figure image does not overlap the object recognition image. The correction process may include correcting the first position acquired in the first state based on the position deviation map.

With this configuration, the processor can relatively easily correct the position of the specific object relative to the target vehicle in the first state.

In the vehicle control system according to another aspect of the present disclosure, the position deviation map may include a plurality of position deviation tables that is selected according to at least one of an image size of the object recognition image, a brightness of the peripheral image, and the first position.

The accuracy of the position information is influenced by the brightness of the peripheral image, the image size of the object recognition image, and the first position. In particular, the influence of these conditions on the accuracy of the position information is large in the first state. With the vehicle control system according to this aspect, it is possible to correct the position of the specific object relative to the target vehicle according to at least one of these conditions.

In the vehicle control system according to another aspect of the present disclosure, the processor may be configured to acquire the first position, a brightness of the peripheral image, and an image size of the object recognition image, the position deviation map may include a plurality of position-specific tables that is selected according to the first position, each of the position-specific tables may include a plurality of brightness-specific tables that is selected according to the brightness of the peripheral image, and each of the brightness-specific tables may include a plurality of size-specific tables that is selected according to the image size and defines the deviation amounts.

With the vehicle control system according to this aspect, it is possible to correct the position of the specific object relative to the target vehicle according to the first position, the brightness of the peripheral image, and the image size of the specific object.

In the vehicle control system according to another aspect of the present disclosure, the size-specific table may define a relationship between the image size of the object recognition image and the deviation amount such that the deviation amount decreases as the image size increases.

In the vehicle control system according to another aspect of the present disclosure, the peripheral image may be an image obtained by imaging a foreground of the target vehicle, and the object recognition device may be configured to identify the specific object by applying the peripheral image to a trained deep neural network, and acquire, as the position information, a distance in a longitudinal direction of the vehicle between the target vehicle and the specific object based on coordinates of a lower end of the region recognized as the specific object in the peripheral image.

In the vehicle control system according to another aspect of the present disclosure, the object recognition image may be a rectangular image; and the processor may be configured to execute the correction process when the figure image overlaps a lower end line of the object recognition image.

When the lower end of the object recognition image overlaps the figure image, the lower end of the object recognition image is blurred. Therefore, it is highly likely that the accuracy of the position information output from the object recognition device is low. For example, the distance between the target vehicle and the specific object may be larger than the actual distance. With the vehicle control system according to this aspect, when the lower end of the object recognition image overlaps the figure image, the distance (distance between the target vehicle and the specific object) acquired based on the image is corrected.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a map defining a relationship between a distance level, a luminance level, and a vertical size level and an offset value;

DETAILED DESCRIPTION OF EMBODIMENTS

Overview

Figure 1:
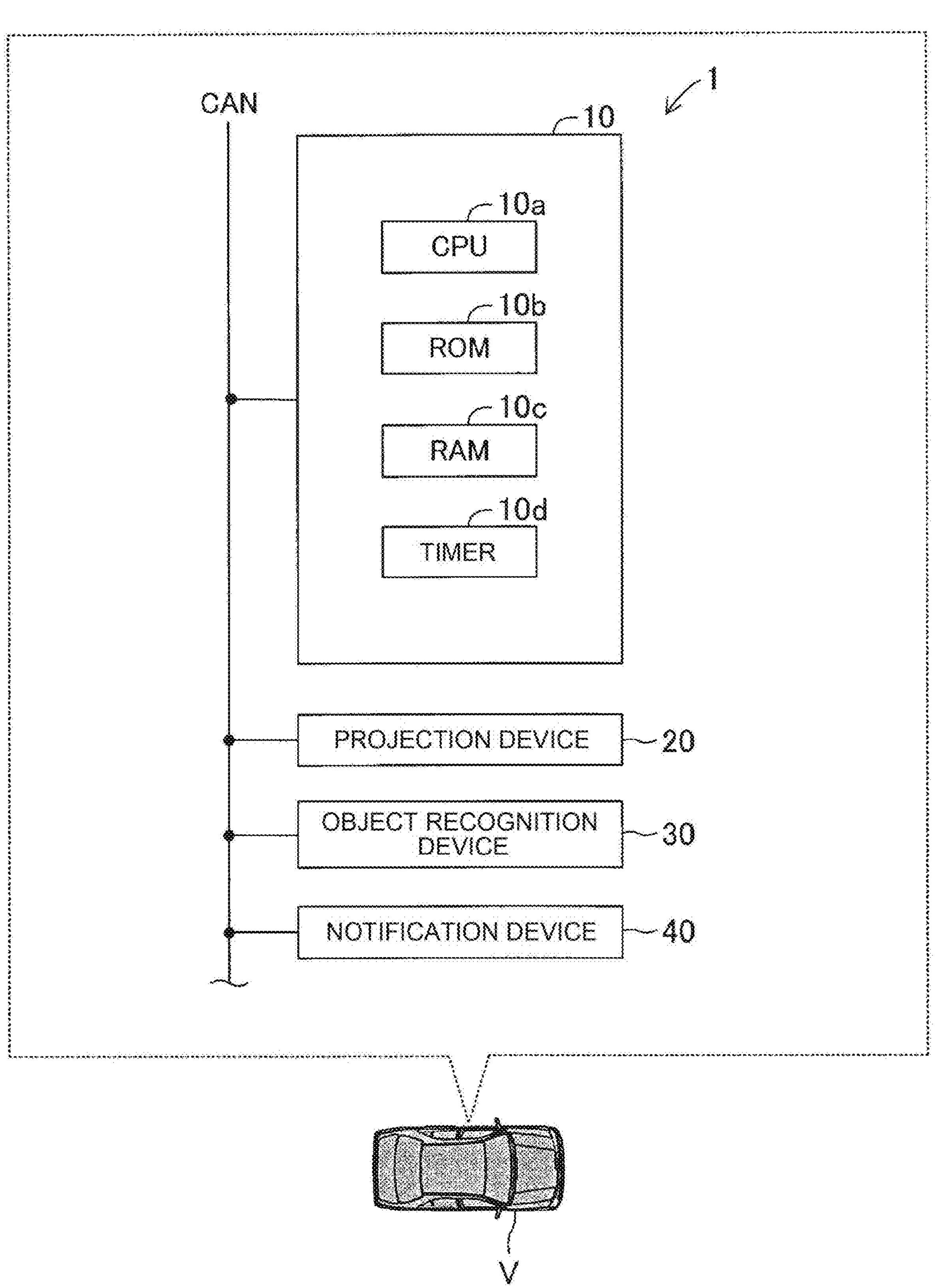
FIG. 1 is a block diagram of a vehicle control system according to an embodiment of the present disclosure.

As illustrated in FIG. 1, a vehicle control system 1 according to an embodiment of the present disclosure is applied to a vehicle V (hereinafter, referred to as a "host vehicle") having an automatic driving function. Further, the vehicle control system 1 has a first notification function of projecting a predetermined pattern figure on a road surface in front of the host vehicle and providing predetermined information to another person located in the vicinity of the host vehicle. The vehicle control system 1 includes a second notification function for providing predetermined information to a driver of the own vehicle when the vehicle and the specific target OB are highly likely to touch on the basis of images obtained by photographing a front area of the own vehicle in a condition in which the autonomous driving function is disabled.

Specific Configuration

As illustrated in FIG. 1, the vehicle control system 1 includes an ECU 10, a projection device 20, an object recognition device 30, and a notification device 40.

ECU 10 includes a microcomputer including a CPU 10*a*, ROM 10*b* (rewritable non-volatile memory), a RAM 10*c*, a timer 10*d*, and the like. CPU realizes various functions by executing a program (instruction) stored in ROM. ECU 10 is connected via a controller area network (CAN) to ECU of the other device.

The projection device 20 projects the pattern figure on the road surface by irradiating beams representing the pattern figure corresponding to the command acquired from ECU 10 toward the road surface in front of the own vehicle (diagonally forward right and/or diagonally forward left).

Figure 2:
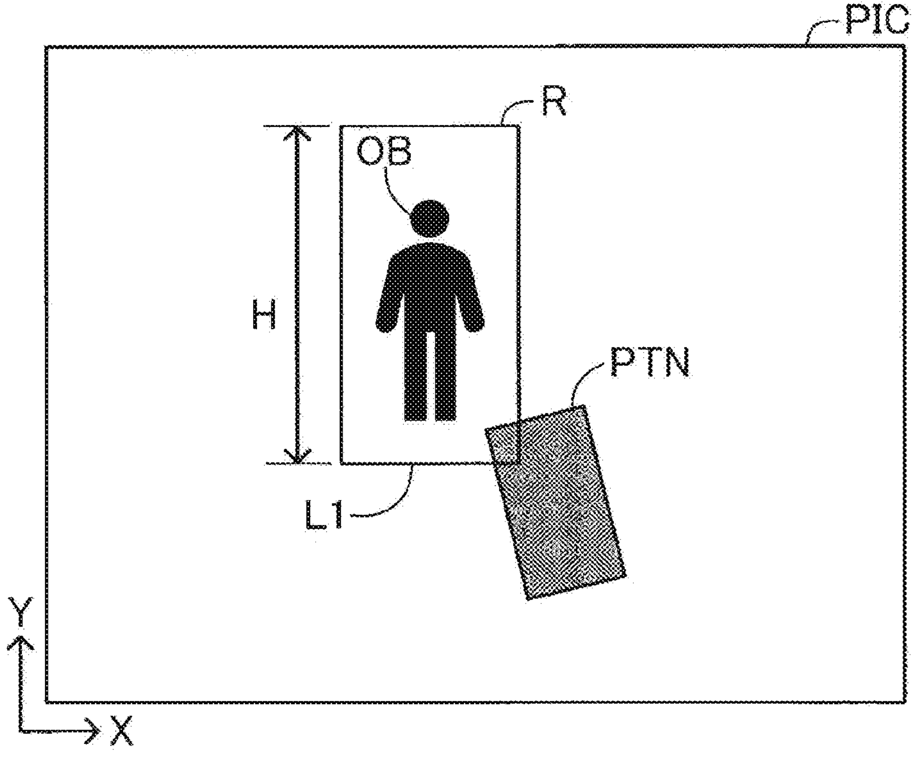
FIG. 2 is an example of a foreground image.

The object recognition device 30 includes an imaging device. The imaging device includes, for example, a CCD. An imaging device is installed in a front portion of the own vehicle. The imaging device is directed toward the front of the host vehicle. The image capturing device captures a foreground of the subject vehicle at a predetermined frame rate, and acquires image data representing the foreground image PIC. The object recognition device 30 further includes an image analysis device. The image analysis device acquires image data from the imaging device, and acquires a brightness BR (an averaged luminance of all pixels) of the foreground image PIC. Further, the image analysis device analyzes the image data (applies the image data to the pre-learned deep neural network DNN (=Deep Neural Network)) to identify an image of a specific target OB (for example, a pedestrian) in the foreground image PIC and an image of a pattern figure (pattern graphic image PTN) projected on the road surface by the projection device 20 (see FIG. 2). The image analysis device calculates a distance ΔD between the host vehicle and the specific target OB in the front-rear direction on the basis of the ordinate Y of the lower end line L1 of the image (target recognition image) of the region (rectangular area R) recognized as the specific target OB in the foreground image PIC. Specifically, the image analysis apparatus acquires the distance ΔD with reference to a map (not shown) that defines the relationship between the ordinate Y and the distance ΔD. The map is designed such that the smaller the ordinate Y is (the closer the rectangular area R is to the lower end of the foreground image PIC), the smaller the range ΔD is. The distance ΔD corresponds to information (position information) regarding the relative position between the host vehicle and the specific target OB. Further, the image analysis apparatus acquires the size (vertical size H) of the rectangular area R. The vertical size H corresponds to the image size of the target recognition image. The image-analysis device provides these computations (brightness BR, vertical size H, and distance ΔD) to ECU 10. In the foreground image PIC, the image analysis device determines whether or not the lower end line L1 of the rectangular area R and the pattern graphic image PTN overlap each other. The image-analysis device provides the determination result to ECU 10.

The notification device 40 includes an image display device and an acoustic device. The image display device is arranged, for example, in an instrument panel (in the vicinity of the speed display device). The image display device displays an image in accordance with a command acquired from ECU 10. The sound device reproduces sound in accordance with a command acquired from ECU 10.

First Notification Function

When the predetermined condition is satisfied, ECU 10 causes the projection device 20 to project the predetermined pattern figure onto the road surface. For example, ECU 10 causes the projection device 20 to project a leftward (rightward) arrow on a road surface obliquely ahead of the host vehicle (diagonally forward right) when the host vehicle turns left (or turns left) (when the direction indicating light on the left side (right side) of the host vehicle is activated (blinking)). Accordingly, the traveling direction of the host vehicle is notified to a pedestrian located in the vicinity of the host vehicle or a driver of another vehicle.

Second Notification Function

ECU 10 sequentially acquires the distance ΔD from the object recognition device 30. ECU 10 calculates an average distance ΔDave, which is an average of distances ΔD corresponding to a plurality of consecutive frames. When the mean distance ΔDave is equal to or less than the threshold ΔDth, ECU 10 transmits a command for displaying a predetermined image (icon) on the image display device of the notification device 40 and transmits a command for reproducing a predetermined sound (beep sound) to the sound device of the notification device 40 so that the driver of the own vehicle is provided with information indicating that there is a high risk of the own vehicle contacting the specific target OB.

Here, when the specific target OB enters the pattern figure projected onto the road surface, or when the specific target OB is located in the vicinity of the pattern figure, a part of the image of the specific target OB may be blurred in the foreground image PIC by irradiating a part of the specific target OB with the beam (direct light or reflected light) of the projection device 20. In this case, in the foreground image PIC, the accuracy of the region (rectangular area R) recognized by the image analysis device as the specific target OB is low, and the accuracy of the distance ΔD acquired based on the coordinates of the lower end line L1 of the rectangular region is low. Specifically, the distance ΔD acquired in a state (first state) in which the lower end line L1 of the rectangular area R and the pattern graphic image PTN overlap each other is larger than the distance ΔD acquired in a state (second state) in which the pattern graphic is not projected onto the road surface or in a state (second state) in which the pattern graphic does not overlap each other. (must be checked for correctness)

In addition, when the specific target OB is relatively far away from the host vehicle, the image of the specific target OB becomes blurred in the foreground image PIC, and thus the accuracy of the range ΔD becomes low. Further, as the brightness BR (ambient brightness) of the foreground image PIC is smaller (darker), the image of the specific target OB becomes blurred, and therefore the accuracy of the range ΔD becomes lower. Further, as the size of the specific target OB in the foreground image PIC (the vertical size H of the rectangular area R) is smaller, the image of the specific target OB becomes blurred (the resolution is lower), and therefore the accuracy of the distance ΔD becomes lower. As described above, the actual position, the brightness BR, and the vertical size H of the specific target OB affect the detection accuracy of the distance ΔD, but the degree of influence in the first state is larger than the degree of influence in the second state.

Therefore, ECU 10 sequentially acquires, from the object recognition device 30, a determination of whether or not the lower end line L1 of the rectangular area R overlaps with the pattern graphic image PTN. ECU 10 corrects the mean-distance ΔDave based on the offset value OFS obtained from the map M1 (position deviation map) when the lower end line L1 and the pattern graphic image PTN overlap, as described below.

As illustrated in FIG. 3, the map M1 is a data base that defines a relation between the distance ΔD (distance level), the brightness BR (brightness level), and the vertical size H (vertical size level), and the offset value OFS. In the map M1, the distance ΔD is classified into a plurality of stages (for example, five stages (distance level 1 (short) to distance level 5 (long))). In the map M1, the brightness BR is classified into a plurality of stages (for example, three stages (brightness level 1 (bright) to brightness level 3 (dark))). Further, the vertical size H is classified into a plurality of stages (for example, six stages (vertical size level 1 (large) to vertical size level 6 (small))). The map M1 includes a table that defines the relation between the respective levels of the distance ΔD, the brightness BR, and the vertical size H, and the offset value OFS. Specifically, the map M1 includes a table TD1 to a table TD5 corresponding to the distance level 1 to the distance level 5. These tables TD1 to TD5 correspond to the position-specific tables. The respective tables TDn (n=1, 2, . . . , 5) are composed of a table TBR1, TBR2, TBR3 corresponding to the brightness level 1 to the brightness level 3. These tables TBR1 to TBR3 correspond to the brightness-specific tables. Furthermore, the respective tables TBRn (n=1, 2, 3) are composed of vertical size tables THm (m=1, 2, . . . , 6) indicating the relation between the vertical size level 1 to the vertical size level 6 and the offset value OFS. These tables TH1 to TH6 correspond to size-specific tables.

The offset value OFS is determined by executing a predetermined calibration process using a calibration device (computer) and six types of simulated body TS1 or simulated body TS6 (models of the specific target OB) having varying heights at the designing stage (or at the time of shipping) of the host vehicle. These six types of simulated body TS1 to simulated body TS6 correspond to the vertical size level 1 to the vertical size level 6. The procedure of the calibration process will be described below.

First, a test vehicle in which the vehicle control system 1 is mounted is placed in a predetermined test chamber. Next, the pattern figure is projected onto the floor surface of the test chamber by the projection device 20. Next, the simulated body TS1 corresponding to the vertical size level 1 is arranged at a predetermined position in the patterned figure projected on the road surface and at a position P1 corresponding to the distance level 1. In this situation, in the foreground image PIC, the lower end line L1 of the rectangular area R and the pattern graphic image PTN overlap each other. Next, the brightness of the illumination of the test chamber is adjusted to match a predetermined brightness corresponding to the brightness level 1.

Figure 4:
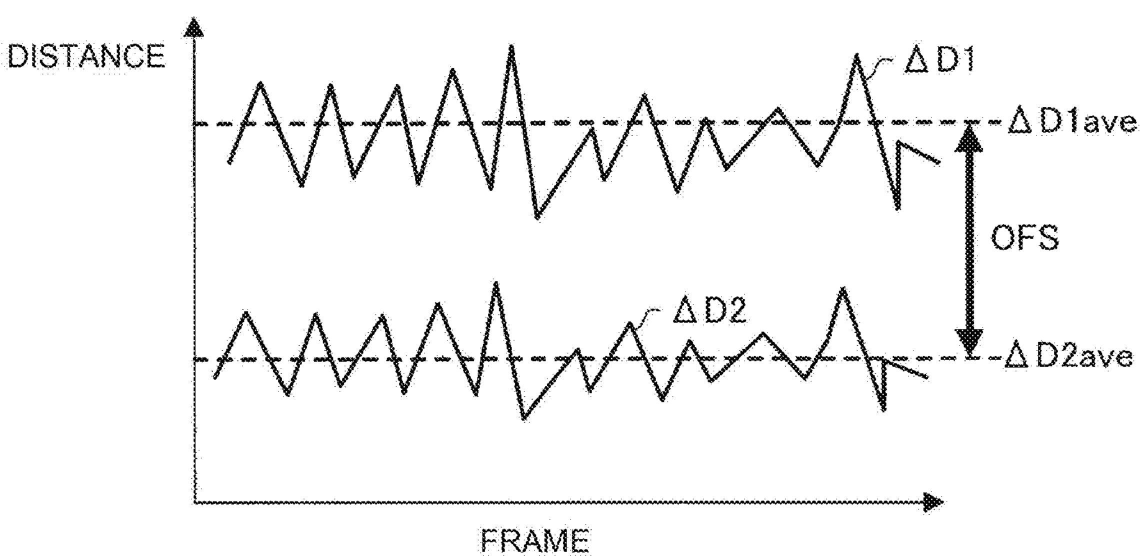
FIG. 4 is a graph showing a distance ΔD1 acquired in a state where a pattern figure is projected on a road surface and a distance ΔD2 acquired in a state where the pattern figure is not projected.

Next, the calibration device sequentially acquires the brightness BR of the foreground image PIC, the vertical size H of the rectangular area R, and the distance ΔD from the object recognition device 30. The calibration device calculates an average of the predetermined number of distances ΔD, the brightness BR, and the vertical size H acquired from the object recognition device 30, and stores the calculation result (average distance ΔD1ave, average brightness BRave, and average vertical size Have). Next, the operation of the projection device 20 is stopped so that the pattern figure is not projected onto the road surface. In this state, the calibration device sequentially acquires the distances ΔD from the object recognition device 30, calculates an average value (average distance ΔD2ave) thereof, and stores the calculation result. Next, the calibration device acquires the deviation between the average distance ΔD1ave and the average distance ΔD2ave as the offset value OFS (see FIG. 4). Then, the calibration device associates the offset value OFS with the average distance ΔD1ave, the average brightness BRave, and the average vertical size Have. In this way, the offset value OFS of the distance level 1, the brightness level 1, and the vertical size level 1 is determined. The mean distance ΔD1ave is a typical value d1 of the distance level 1. The mean brightness BRave is a typical value br1 of the brightness level 1. The mean longitudinal size Have is a representative h1 of the vertical size level 1. The average distance ΔD1ave corresponds to the first position, and the average distance ΔD2ave corresponds to the second distance. The offset value OFS corresponds to a deviation between the first position and the second position.

Next, instead of the simulated body TS1, the simulated body TS2 corresponding to the vertical size level 2 is arranged in the position P1. The brightness of the illumination of the test chamber is maintained at the brightness corresponding to the brightness level 1. Under this test environment, the average distance ΔD1ave, average distance ΔD2ave, etc. are obtained by the same procedure as the above procedure. Next, the calibration device acquires the deviation between the average distance ΔD1ave and the average distance ΔD2ave as the offset value OFS. Then, the calibration device associates the offset value OFS with the average distance ΔD1ave, the average brightness BRave, and the average vertical size Have. In this manner, the offset value OFS corresponding to the distance level 1, the brightness level 1, and the vertical size level 2 is determined. The mean vertical size Have is a typical h2 of the vertical size level-2.

Next, the simulated body TS3, the simulated body TS4, the simulated body TS5, and the simulated body TS6 are sequentially arranged in the position P1 without changing the brightness of the illumination of the test chamber, and the offset value OFS corresponding to the distance level 1, the distance level 1, and the vertical size level m (m=3, 4, 5, 6) are sequentially acquired in the same manner as described above.

Next, the brightness of the illumination of the test chamber is adjusted to a predetermined brightness corresponding to the brightness level 2. Then, the simulated body TS1 to the simulated body TS6 are sequentially arranged in the position P1, and the offset value OFS corresponding to the distance level 1, the brightness level 2, and the vertical size level m (m=1, 2, . . . , 6) are sequentially acquired in the same manner as described above. Next, the brightness of the illumination of the test chamber is adjusted to a predetermined brightness corresponding to the brightness level 3. Then, the simulated body TS1 to the simulated body TS6 are sequentially arranged in the position P1, and the offset value OFS corresponding to the distance level 1, the brightness level 3, and the vertical size level m (m=1, 2, . . . , 6) are sequentially acquired in the same manner as described above.

Next, the brightness of the illumination of the test chamber is readjusted to a predetermined brightness corresponding to the brightness level 1. Then, the simulated body TS1 to the simulated body TS6 are sequentially arranged in the position P2 corresponding to the distance level 2, and the offset value OFS corresponding to the distance level 2, the brightness level 1, and the vertical size level m (m=1, 2, . . . , 6) are sequentially acquired in the same manner as described above.

Thereafter, offset value OFS corresponding to other test environments (other combinations of distance level, brightness level, and vertical size level) are obtained in a manner similar to that described above.

In the respective brightness-specific table TBRa (a=1, 2, 3) of the map M1 constructed in the above-described manner, the offset value OFS of the vertical size level m (m=1, 2, . . . ) is smaller than the offset value OFS of the vertical size level n (m<n). In addition, in the brightness-specific table TBra of the distance table (position-specific table) TDx, the offset value OFS of the vertical size level m is equal to or smaller than the offset value OFS of the vertical size level m in the brightness-specific table TBRb (b>a) of the same distance table TDx. In addition, the offset value OFS of the vertical size level m in the brightness-specific table TBRa of the distance table TDi (i=1, 2, . . . ) is equal to or smaller than the offset value OFS of the vertical size level m in the brightness-specific table TBRa of the distance table TDj (j>i). This map M1 is written to ROM 10*b* when the vehicle V is produced.

ECU 10 sequentially acquires the distances ΔD from the object recognition device 30 while the object recognition device 30 is activated. Further, when the pattern figure is projected on the road surface by the projection device 20, ECU 10 sequentially acquires, from the object recognition device 30, the determination result regarding the overlap between the lower end line L1 of the rectangular area R and the pattern graphic image PTN in the foreground image PIC. When the determination result indicating that the lower end line L1 and the pattern graphic image PTN overlap each other is acquired, ECU 10 sequentially acquires the brightness BR and the vertical size H in addition to the distance ΔD from the object recognition device 30. ECU 10 calculates a distance ΔD corresponding to a predetermined number of consecutive frames, an average distance ΔDave that is an average of the brightness BR and the vertical size H, an average brightness BRave, and an average vertical size Have. ECU 10 specifies a distance level at which a representative value of the distance level 1, the distance level 2, and the distance level 5 is closest to the present mean distance ΔDave. ECU 10 specifies a brightness level at which a typical value of the brightness level 1, the brightness level 2, and the brightness level 3 is closest to the present mean brightness BRave. Further, ECU 10 specifies a vertical size level in which a typical value of the vertical size level 1, the vertical size level 2, and the vertical size level 6 is closest to the present value Have. ECU 10 obtains, from the map M1, offset value OFS corresponding to the specified (selected) distance level, brightness level, and vertical size level. ECU 10 performs the second notification process when the corrected average distance ΔDave obtained by subtracting the offset value OFS from the average distance ΔDave is equal to or smaller than the threshold ΔDth.

On the other hand, in the foreground image PIC, ECU 10 does not correct the mean distance ΔDave if the determination result indicating that the lower end line L1 and the pattern graphic image PTN overlap is not acquired. That is, ECU 10 executes the second notification process when the average distance ΔD, which is the average value of the distances ΔD sequentially acquired from the object recognition device 30, is equal to or smaller than the threshold ΔDth.

Figure 5:
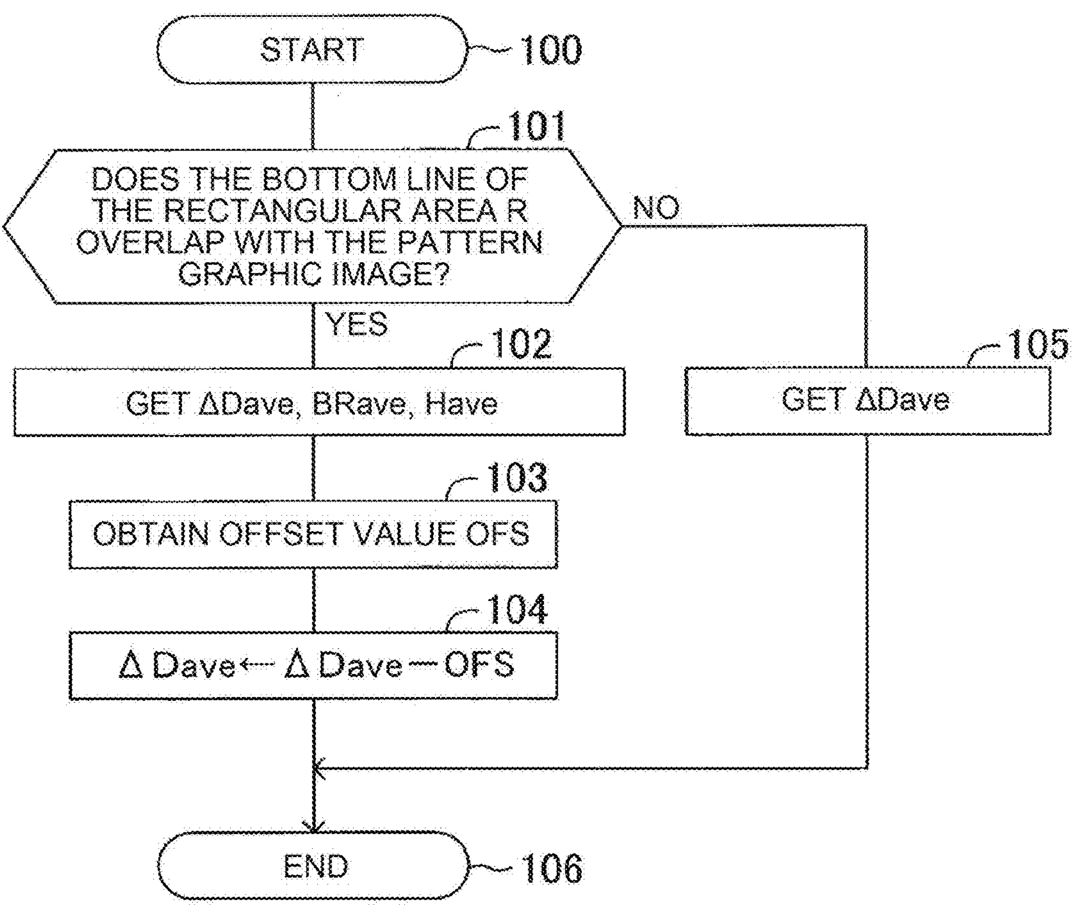
FIG. 5 is a flow chart of a program executed by CPU to realize a function of correcting the distance ΔD acquired by the object recognition device.

Next, referring to FIG. 5, a program PR1 executed by a CPU 10*a* of ECU 10 (hereinafter, simply referred to as "CPU") in order to realize the above-described function of correcting the mean distance ΔDave will be described.

Program PR1

CPU starts executing the program PR1 at a predetermined cycle when the pattern figure is projected on the road surface by the projection device 20. CPU starts executing the program PR1 from step 100, and advances the process to step 101.

In step 101, CPU acquires, from the object recognition device 30, a determination regarding the overlap between the lower end line L0 of the rectangular area R and the pattern graphic image PTN. When CPU acquires a determination result indicating that the lower end line L1 and the pattern graphic image PTN overlap with each other (101: Yes), the process proceeds to step 102. On the other hand, if CPU does not acquire a determination result indicating that the lower end line L1 and the pattern graphic image PTN overlap (101: No), the process proceeds to step 105.

In step 102, CPU acquires the distance ΔD, the brightness BR, and the vertical size H from the object recognition device 30. Each time CPU acquires the information, it stores the information in a RAM 10*c* (ring buffer). Thus, RAM 10*c* stores a distance ΔD, a brightness BR, and a vertical size H (time-series data) corresponding to a predetermined number of frames (foreground image PIC). CPU calculates an average distance ΔDave, an average brightness BRave, and an average longitudinal size Have based on the time series data. CPU then proceeds to step 103.

CPU refers to the map M1 to obtain the offset value OFS in step 103. That is, CPU specifies the average distance ΔDave, the average brightness BRave, and the distance level, the luminance level, and the vertical size level of the average vertical size Have, respectively. Then, CPU acquires the offset value OFS corresponding to the specified levels from the map M1. CPU then proceeds to step 104.

In step 104, CPU employs the value obtained by subtracting the offset value OFS from the average distance ΔDave as the corrected average distance ΔDave. Then, CPU advances the process to step 106, and in step 106, the program PR1 (the process of correcting the mean distance ΔDave) is finished.

When the process proceeds from step 101 to step 105, CPU acquires the distance ΔD from the object recognition device 30 and stores the distance ΔD in RAM 10*c*. Then, CPU calculates the mean distance ΔDave based on the time-series data of the distance ΔD stored in RAM 10*c*. Then, CPU proceeds to step 106 without correcting the mean-distance ΔDave, and ends the program PR1 in step 106.

Effect

As described above, the vehicle control system 1 includes the projection device 20 that projects a predetermined figure on the road surface in front of the host vehicle, and the object recognition device 30 that acquires the distance ΔD as position information representing the relative position between the host vehicle and the specific target OB on the basis of the foreground image PIC. Here, in the foreground image PIC, when the lower end line L1 of the rectangular area R and the pattern graphic image PTN overlap each other, the accuracy of the position information may be low. According to the vehicle control system 1, when both images overlap, the average distance ΔDave is corrected by a predetermined correction process. In addition, a decrease in the detection accuracy of the distance ΔD between the specific target OB and the host vehicle is suppressed.

The present disclosure is not limited to the above-described embodiments, and various modifications can be adopted within the scope of the present disclosure as described below.

Modification 1

In the above embodiment, the distance ΔD is classified into the distance level 1 to the distance level 5 in the map M1, but the number of distance levels (the number of segments) may be changed. For example, in the map M1, the distance ΔD may be classified into various levels as compared with the above-described embodiment. In the map M1, the brightness level and the vertical size level may be changed.

Modification 2

In the above-described embodiment, when the predetermined condition is satisfied, ECU 10 causes the projection device 20 to project a figure indicating the traveling direction of the host vehicle onto the road surface. Alternatively, ECU 10 may cause the projection device 20 to project a pattern graphic image for detecting the unevenness of the road surface on the road surface when the predetermined condition is satisfied. The object recognition device 30 detects the unevenness of the road surface based on the distortion of the pattern graphic image PTN in the foreground image PIC.

Modification 3

In the above-described embodiment, ECU 10 executes the second notification processing when the mean distance ΔD is equal to or smaller than the threshold ΔDth, but instead of or in addition to this, the automatic braking processing for automatically braking the host vehicle may be executed.

Modification 4

In the above-described embodiment, the projection device 20 is directed toward the front of the own vehicle, and the imaging device of the object recognition device 30 is directed toward the front of the own vehicle. Alternatively, these devices may be directed to the rear of the host vehicle. That is, the projection device 20 may project a predetermined pattern figure on a road surface behind the host vehicle. Then, the object recognition device 30 may be capable of recognizing a specific target located behind the host vehicle.

What is claimed is:

1. A vehicle control system comprising:

a projection device configured to project a predetermined figure on a road surface around a target vehicle;

an object recognition device configured to recognize a specific object located around the target vehicle based on a peripheral image obtained by imaging a peripheral region around the target vehicle, and output position information that is information on a relative position between the target vehicle and the specific object;

a processor configured to control the projection device and the object recognition device; and a position deviation map that defines a deviation amount between a first position and a second position, the first position and the second position being acquired from the position information output from the object recognition device when a positional relationship between the target vehicle and the specific object is the same, the first position being a position of the specific object relative to the target vehicle and acquired from the position information output in a first state in which a figure image overlaps an object recognition image, the figure image being projected on the road surface by the projection device, and the object recognition image being an image of a region recognized as the specific object in the peripheral image, the second position being a position of the specific object relative to the target vehicle and acquired from the position information output in a second state in which the figure image does not overlap the object recognition image, wherein:

the processor is configured to execute a correction process including correcting the relative position acquired from the position information when the figure image overlaps the object recognition image; and the correction process includes correcting the first position acquired in the first state based on the position deviation map.

2. The vehicle control system according to claim 1, wherein the position deviation map includes a plurality of position deviation tables that is selected according to at least one of an image size of the object recognition image, a brightness of the peripheral image, and the first position.

3. The vehicle control system according to claim 1, wherein:

the processor is configured to acquire the first position, a brightness of the peripheral image, and an image size of the object recognition image;

the position deviation map includes a plurality of position-specific tables that is selected according to the first position;

each of the position-specific tables includes a plurality of brightness-specific tables that is selected according to the brightness of the peripheral image; and each of the brightness-specific tables includes a plurality of size-specific tables that is selected according to the image size and defines the deviation amounts.

4. The vehicle control system according to claim 1, wherein:

the object recognition image is a rectangular image; and the processor is configured to execute the correction process when the figure image overlaps a lower end line of the object recognition image.

* * * * *